(12) United States Patent
Contractor et al.

(10) Patent No.: US 11,660,811 B1
(45) Date of Patent: May 30, 2023

(54) 3D-PRINTER SYSTEM HAVING A PNEUMATIC SYSTEM FOR PREVENTING DRIPPAGE OF EXCESS PRINT MATERIAL

(71) Applicant: BeeHex, LLC, Columbus, OH (US)

(72) Inventors: Anjan Contractor, Lewis Center, OH (US); Benjamin Feltner, Blacklick, OH (US)

(73) Assignee: BeeHex Automation, Inc., Columbus, OH (US)

( * ) Notice: Subject to any disclaimer, the term of this patent is extended or adjusted under 35 U.S.C. 154(b) by 230 days.

(21) Appl. No.: 16/537,432

(22) Filed: Aug. 9, 2019

Related U.S. Application Data

(63) Continuation-in-part of application No. 15/064,370, filed on Mar. 8, 2016, now Pat. No. 10,384,389.

(51) Int. Cl.
*B29C 48/475* (2019.01)
*B29C 64/343* (2017.01)
(Continued)

(52) U.S. Cl.
CPC .............. *B29C 64/227* (2017.08); *A23G 1/04* (2013.01); *A23P 20/20* (2016.08); *B29C 48/475* (2019.02); *B29C 64/343* (2017.08); *B29C 64/364* (2017.08); *B33Y 30/00* (2014.12); *B33Y 40/00* (2014.12); *B33Y 70/00* (2014.12); *A23P 2020/253* (2016.08); *B29C 64/209* (2017.08); *B29K 2103/08* (2013.01)

(58) Field of Classification Search
CPC ..... B29C 48/02; B29C 48/365; B29C 48/475; B29C 64/343; B29C 64/205; B29C 64/209; B29C 2948/92571; B29C 48/05; B29C 48/18; B29C 48/266; B29C 48/2886; B29C 48/92; B29C 64/106; B33Y 30/00
USPC ........................................................ 425/375
See application file for complete search history.

(56) References Cited

U.S. PATENT DOCUMENTS 3,349,859 A * 10/1967 Cox, Jr. ..................... B65B 3/14
177/118
4,178,974 A * 12/1979 Levin ..................... B01L 3/0217
141/119
(Continued)

FOREIGN PATENT DOCUMENTS

WO   WO-2014190217 A1 * 11/2014 .............. A23P 30/10

*Primary Examiner* — Philip C Tucker
*Assistant Examiner* — Jimmy R Smith, Jr.
(74) *Attorney, Agent, or Firm* — Rutan & Tucker LLP; Kyle M. St. James

(57) ABSTRACT

An apparatus is disclosed that includes a printer cartridge having a cartridge barrel for containing print material, an extruder having a nozzle and a lever arm, the lever arm including a plunger, the plunger having an inlet port, and a pneumatic system including a pneumatic piston, a solenoid valve and a Y-connector, wherein the pneumatic piston is configured to receive pressurized air from (1) the Y-connector to lower the lever arm to align the inlet port with an entry point of the extruder enabling print material to flow into the extruder through the inlet port, and (2) the solenoid valve to raise the lever arm to misalign the inlet port and the entry point to prevent additional print material to flow into the extruder. The apparatus further includes a build platform, and a plurality of rods and screws for guiding the extruder to dispense print material on the build platform.

11 Claims, 9 Drawing Sheets

(51) Int. Cl.
*B29C 64/209* (2017.01)
*B29C 64/227* (2017.01)
*B33Y 30/00* (2015.01)
*B29C 64/364* (2017.01)
*B33Y 40/00* (2020.01)
*A23P 20/20* (2016.01)
*A23G 1/04* (2006.01)
*B33Y 70/00* (2020.01)
*A23P 20/25* (2016.01)
*B29K 103/08* (2006.01)

(56) References Cited

U.S. PATENT DOCUMENTS

| | | | |
|---|---|---|---|
| 4,536,147 A * | 8/1985 | Groff | A21C 3/08 |
| | | | 425/146 |
| 10,384,389 B2 * | 8/2019 | Contractor | B29C 64/343 |
| 2001/0011510 A1 * | 8/2001 | Koehler | B41F 31/022 |
| | | | 101/350.1 |
| 2017/0259482 A1 * | 9/2017 | Contractor | B29C 48/266 |

* cited by examiner

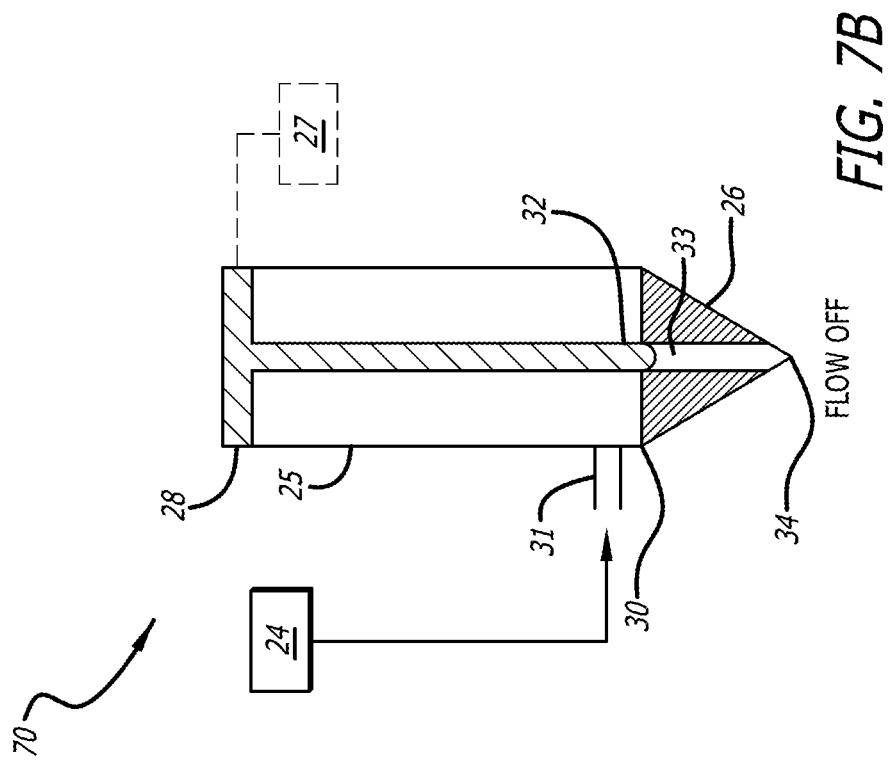
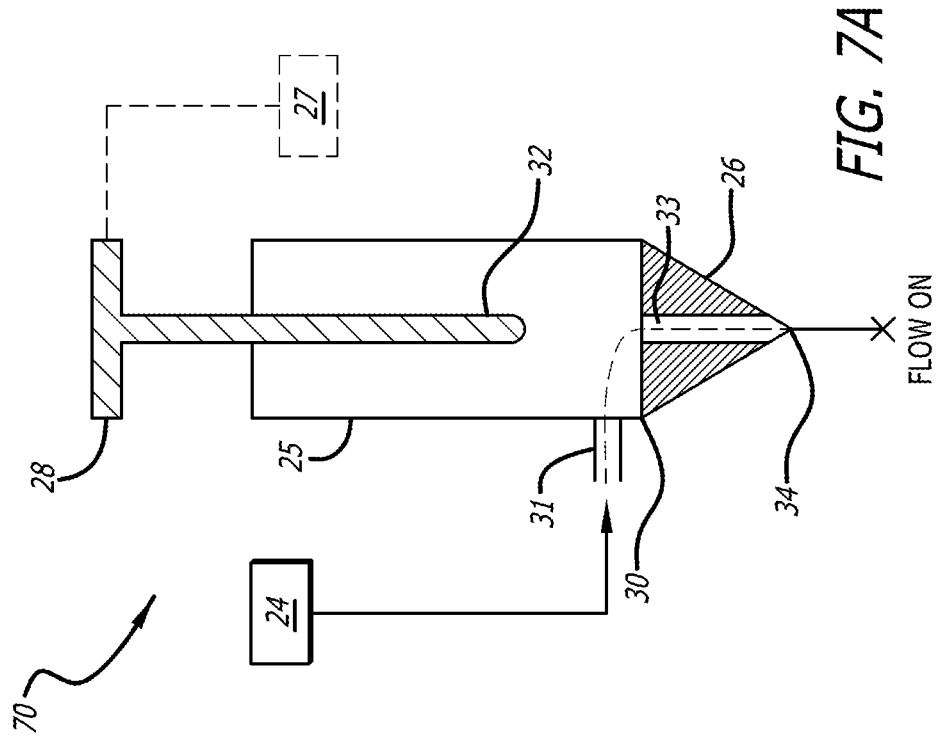
FIG. 7A
FIG. 7B

3D-PRINTER SYSTEM HAVING A PNEUMATIC SYSTEM FOR PREVENTING DRIPPAGE OF EXCESS PRINT MATERIAL

CROSS-REFERENCE TO RELATED APPLICATIONS

This application is a continuation-in-part of U.S. patent application Ser. No. 15/064,370, filed Mar. 8, 2016, now U.S. Pat. No. 10,384,389, issued Aug. 20, 2019, the entire contents of which are incorporated by reference herein.

TECHNICAL FIELD

The present invention relates to printers in general, and in particular to a printer for performing three-dimensional printing.

BACKGROUND

Three-dimensional (3D) printing is a process of making a 3D solid object through an additive process, in which successive layers of material are laid down based on a digital model. Three most commonly used 3D printing methods are stereolithography, selective laser sintering and fused deposition method.

A 3D printer typically includes an extruder (or print head) having a nozzle. A build material, which originates from an upstream feed of a raw polymer in the form of a filament, is fed into an upper region of the extruder as a solid. After being melted within the extruder, the filament exits the extruder in its molten form via the nozzle in a continuous stream. The melted filament can be deposited onto a build platform layer-by-layer. By adding hundreds or thousands thin layers of build material on top of one another, a 3D solid object is created.

Typically used for prototyping, 3D printing is considered a distinct field in the area of injection molding of raw plastic materials.

SUMMARY OF THE INVENTION

In accordance with a preferred embodiment of the present invention, a three-dimensional printer includes a printer cartridge, an extruder, a pneumatic system and multiple rods and screws. The printer cartridge is configured to contain print material. The extruders includes an extruder syringe barrel and a nozzle. The pneumatic system includes a first air path and a second air path. During a printing operation, the first air path allows pressurized air to push the print material from the printer cartridge to the extruder syringe barrel of the extruder. When the printing operation stops, the second air path allows pressurized air to prevent any unwanted dripping of the print material out of the nozzle of the extruder.

In some embodiments, the pneumatic system includes a pneumatic piston, a solenoid valve and a Y-connector, wherein the pneumatic piston is configured to receive pressurized air from (1) the Y-connector to lower the lever arm to align the inlet port with an entry point of the extruder enabling the print material to flow into the extruder through the inlet port, and (2) the solenoid valve to raise the lever arm to misalign the inlet port and the entry point to prevent additional print material to flow into the extruder.

In other embodiments, the pneumatic system including a pneumatic piston, a solenoid valve and a Y-connector, wherein the pneumatic piston is configured to receive pressurized air from (1) the Y-connector to position the lever arm to prevent extrusion of the print material through the nozzle, and (2) the solenoid valve to position the lever arm to enable extrusion of the print material through the nozzle. Further, in some embodiments, the Y-connector is configured to position the lever arm to prevent extrusion of the print material by lowering a distal end of the lever arm to block the print material from entering a nozzle lumen. In alternative embodiments, the Y-connector is configured to position the lever arm to prevent extrusion of the print material by lowering a distal end of the lever arm to block the print material from entering the extruder.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 7A is a block diagram of a first example of a portion of a pneumatic system within a 3D printer wherein print material is able to flow through a distal end of a nozzle of the pneumatic system, in accordance with a preferred embodiment of the present invention;

FIG. 7B is a block diagram of the first example of the portion of a pneumatic system of FIG. 7A wherein print material is unable to flow through a distal end of a nozzle of the pneumatic system, in accordance with a preferred embodiment of the present invention;

DETAILED DESCRIPTION OF A PREFERRED EMBODIMENT

Figure 1A:
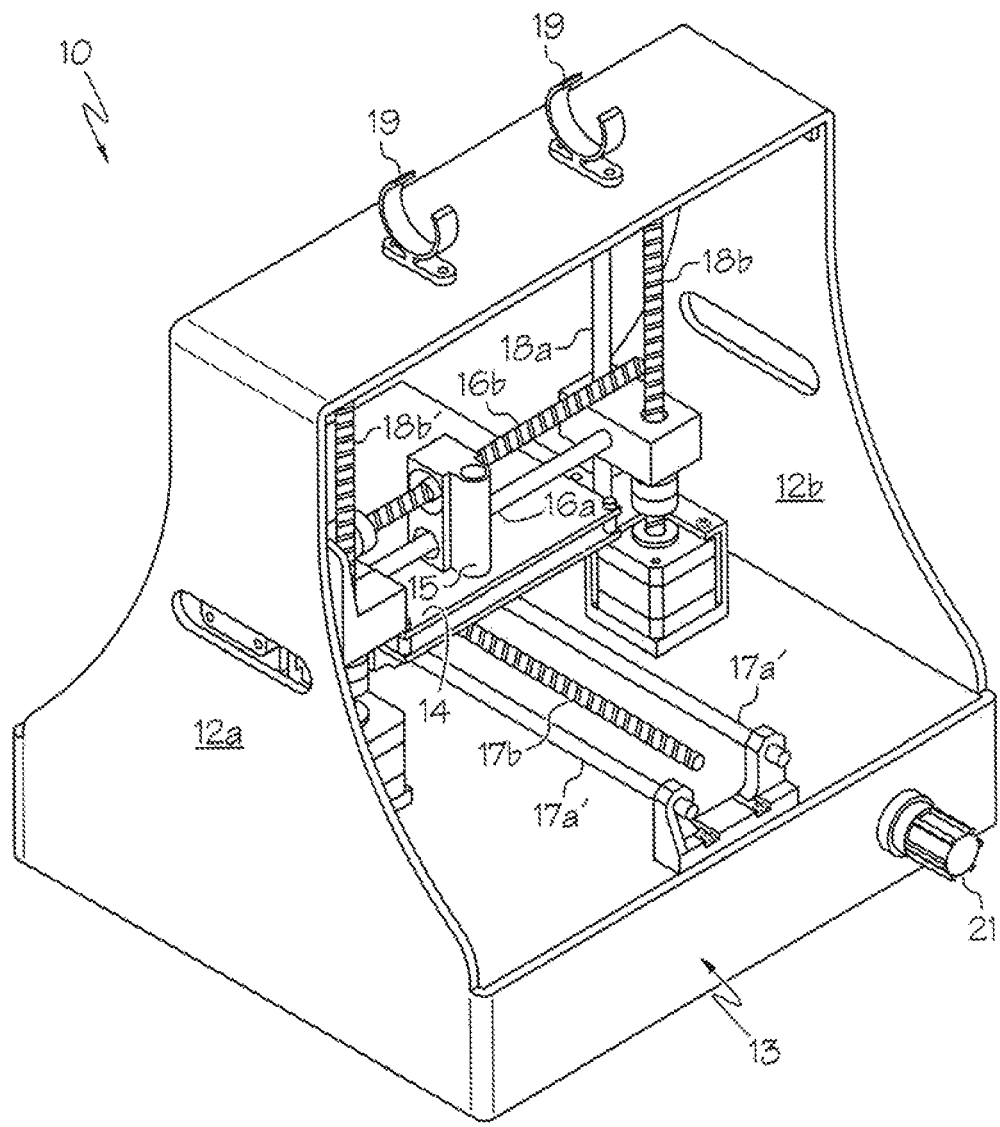
FIGS. 1A-1C are an isometric view, front view and cross-sectional view of a three-dimensional (3D) printer, respectively, in accordance with a preferred embodiment of the present invention.
Figure 1B:
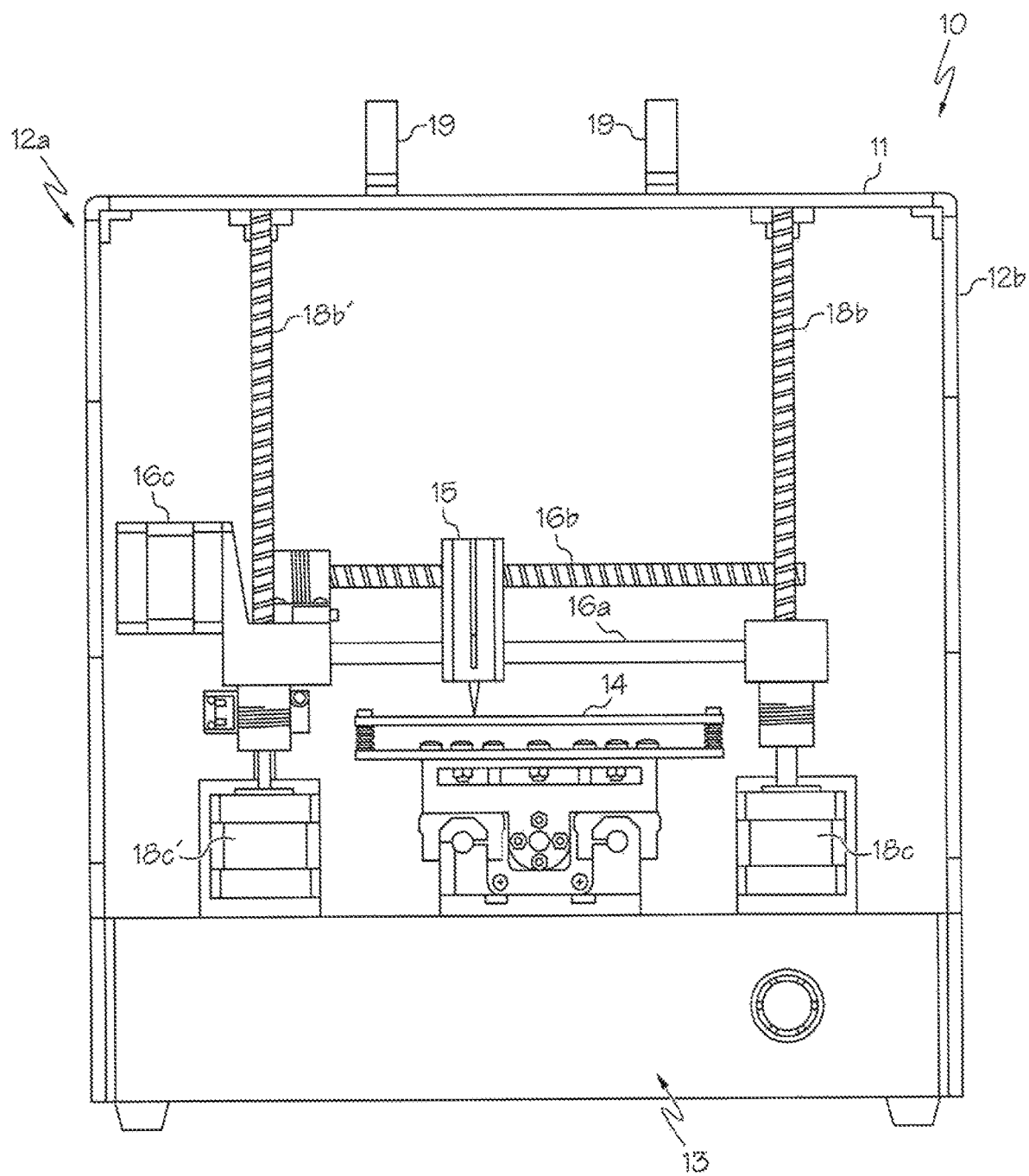
Figure 1C:
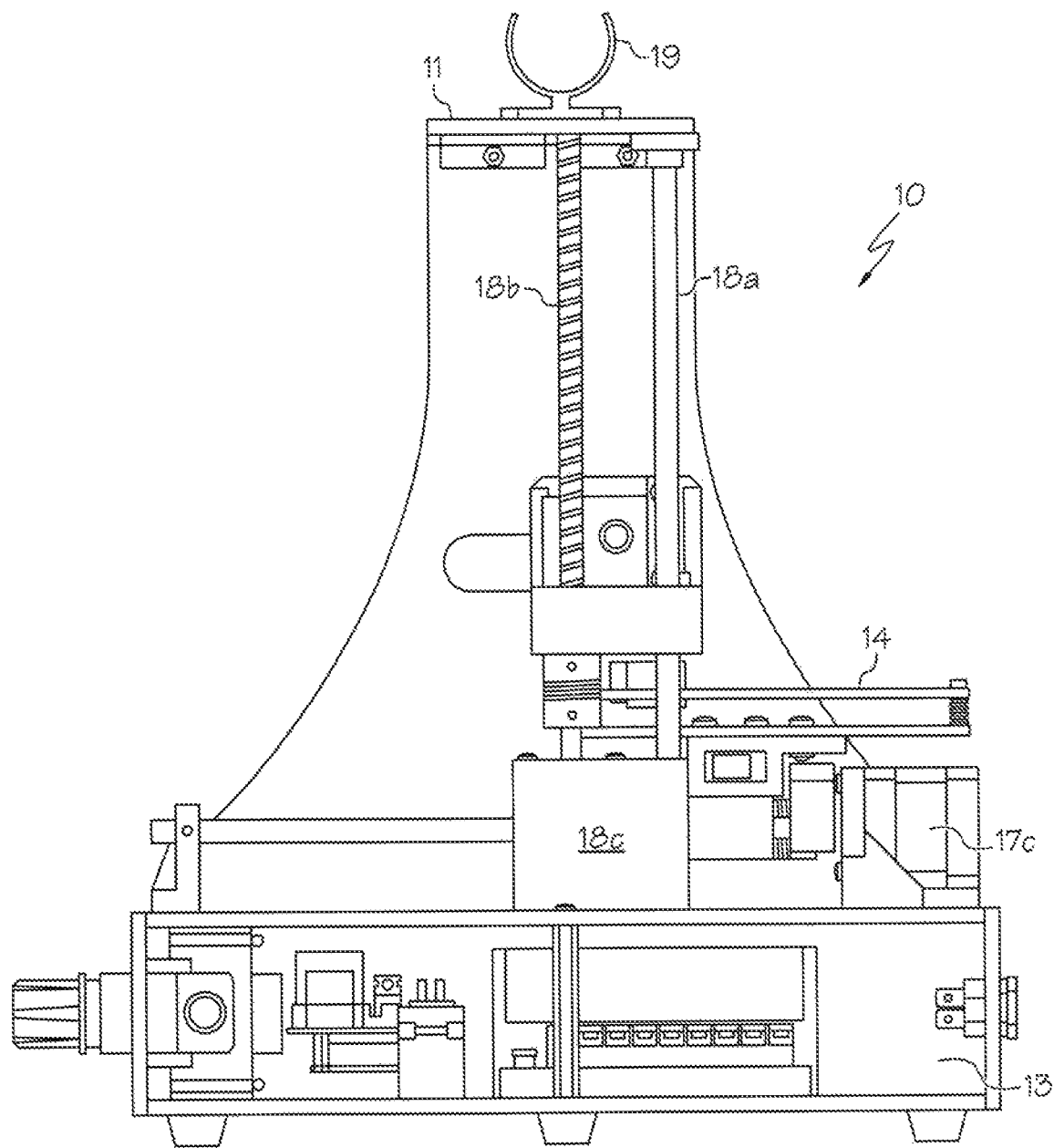

Referring now to the drawings and in particular to FIGS. 1A-1C are an isometric view, front view and cross-sectional view of a three-dimensional (3D) printer, respectively, in accordance with a preferred embodiment of the present invention. As shown, a 3D printer 10 includes a chassis formed by a top panel 11, a pair of side panels 12a, 12b and a bottom compartment 13. Preferably, side panels 12a, 12b are in trapezoidal shapes, although other shapes are also acceptable.

3D printer 10 also includes components such as one X-axis rod 16a in parallel with one X-axis screw 16b, two Y-axis rods 17a, 17a' in parallel with one Y-axis screw 17b, and two Z-axis rods 18a-18a' in parallel with two Z-axis screws 18b-18b'. X-axis screw 16b is turned by an X-axis stepper motor 16c to move an extruder 15 in an X-direction. Y-axis screw 17b is turned by a Y-axis stepper motor 17c to move a build platform 14 in a Y direction. Z-axis screws 18b-18b' are turned by Z-axis stepper motors 18c-18c', respectively, to move X-axis rod 16a, X-axis screw 16b, X-axis stepper motor 16c along with extruder 15 together in a Z direction. Rods 16a, 17a, 18a-18a' and screws 16b, 17b, 18b-18b' guide extruder 15 to dispense print material at specific locations layer-by-layer to form a 3D solid object on build platform 14.

Bottom compartment 13 may contain a circuit board, a power supply and a pneumatic system having an air intake 21.

A printer cartridge (see FIG. 4) containing print material can be secured on top panel 11 via a pair of cartridge mounts 19. The printer cartridge may contain print material such as plastisol, polymer clay, melted sugar and melted chocolate. The print material can be pushed out of the printer cartridge via a piston, and then travels through the pneumatic system to enter extruder 15.

Figure 2:
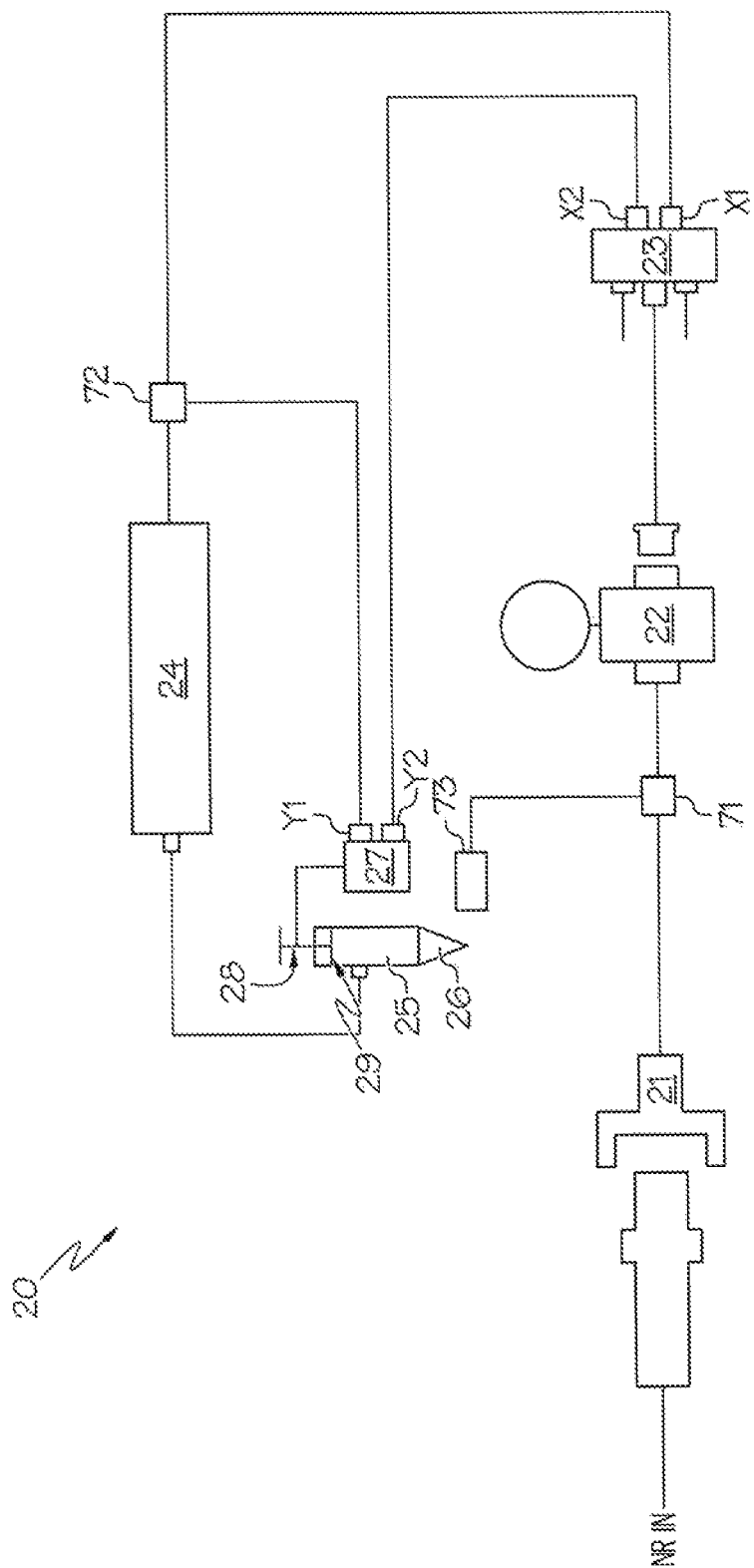
FIG. 2 is a block diagram of a pneumatic system within the 3D printer from FIGS. 1A-1C, in accordance with a preferred embodiment of the present invention.

With reference now to FIG. 2, there is depicted a block diagram of a pneumatic system within 3D printer 10, in accordance with a preferred embodiment of the present invention. As shown, a pneumatic system 20 includes air intake 21, a pressure regulator 22, a solenoid valve 23, a cartridge barrel 24 and an extruder syringe barrel 25. Cartridge barrel 24 is contained within a printer cartridge, and extruder syringe barrel 25 is contained within extruder 15 (from FIGS. 1A-1C). Pressurized air enters 3D printer 10 via air intake 21 and proceeds to pressure regulator 22. Pressure regulator 22 regulates the pressure of the incoming pressurized air. Because each type of print materials has a different viscosity (e.g., ink verses food ingredients), each type of print materials is associated with a unique pressure setting, which can be set by an operator of 3D printer 10.

Pressurized air regulated at a specific pressure then enters solenoid valve 23. Solenoid valve 23 has one entry port and two exit ports x1, x2. Pressurized air may exit solenoid valve 23 through either exit port x1 or exit port x2 at any given time based on an electrical signal from a processor (see FIG. 5). Pressurized air can only exit solenoid valve 23 through either exit port x1 or exit port x2 at any given time, and never exit solenoid valve 23 through both exit port x1 and exit port x2 at the same time.

During a printing operation, pressurized air exits solenoid valve 23 via exit port x1 and enters a Y-connector 72 that sends the pressurized air to cartridge barrel 24 and an air-activated pneumatic piston 27. Within cartridge barrel 24, the pressurized air pushes a piston (not shown) that, in turn, pushes the print material out of cartridge barrel 24. The print material then enters extruder syringe barrel 25. The pressurized air also enters pneumatic piston 27 via an entry port y1. Pneumatic piston 27 is connected to a lever arm 28 and a plunger 29. After extruder syringe barrel 25 has been filled with the print material, the print material can then be selectively extruded out of a nozzle 26 by plunger 29 according to a digital design file.

When printing has already been stopped, because of the fluid nature of the print material and gravitational pull, the print material may still be dripping out of nozzle 26. In order to prevent unwanted dripping of the print material out of nozzle 26, pneumatic piston 27, lever arm 28 and plunger 29 are utilized to provide back pressure within extruder syringe barrel 25. Specifically, pressure is released from exit port x1 to stop printing, and pressure is immediately applied to exit port x2 such that pressurized air exits solenoid valve 23 via exit port x2 and enters pneumatic piston 27 via entry port y2 to raise lever arm 28. Lever arm 28 is connected to plunger 29. When lever arm 28 is raised, plunger 29 is also raised within extruder syringe barrel 25 to change the internal volume of extruder syringe barrel 25, which instantaneously produces a suction within extruder syringe barrel 25 to prevent the print material from dripping through nozzle 26.

When the print material needs to be extruded out of nozzle 26 again (i.e., printing resumes), pressurized air is switched from exiting solenoid valve 23 via exit port x2 back to exiting solenoid valve 23 via exit port x1. At this instance, pressurized air from solenoid valve 23 again pushes the print material from cartridge barrel 24 to extruder syringe barrel 25 and nozzle 26.

Alternatively, plunger 29 within extruder syringe barrel 25 can be pulled or pushed by using a spring mechanism (not shown) to generate or release a suction within extruder syringe barrel 25.

The temperature of pressurized air is generally colder than the ambient temperature when being released, and pressurized air can be utilized during printing to cool down a certain printed material coming out of nozzle 26 in order for the printed material to retain its shape. For example, when melted chocolate is being pushed out of nozzle 26, pressurized air can be released from a cooling diffuser 73 to make the temperature surrounding nozzle 26 lower than the melted chocolate coming out of nozzle 26, and as a result, the melted chocolate will be solidified instantaneously.

Figure 3B:
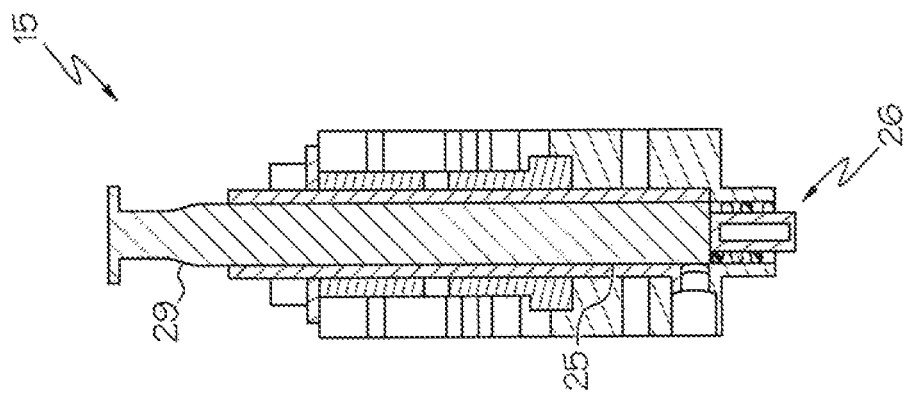
FIGS. 3A-3B are side and cross-sectional views of an extruder within the 3D printer from FIGS. 1A-1C, in accordance with a preferred embodiment of the present invention.
Figure 3A:
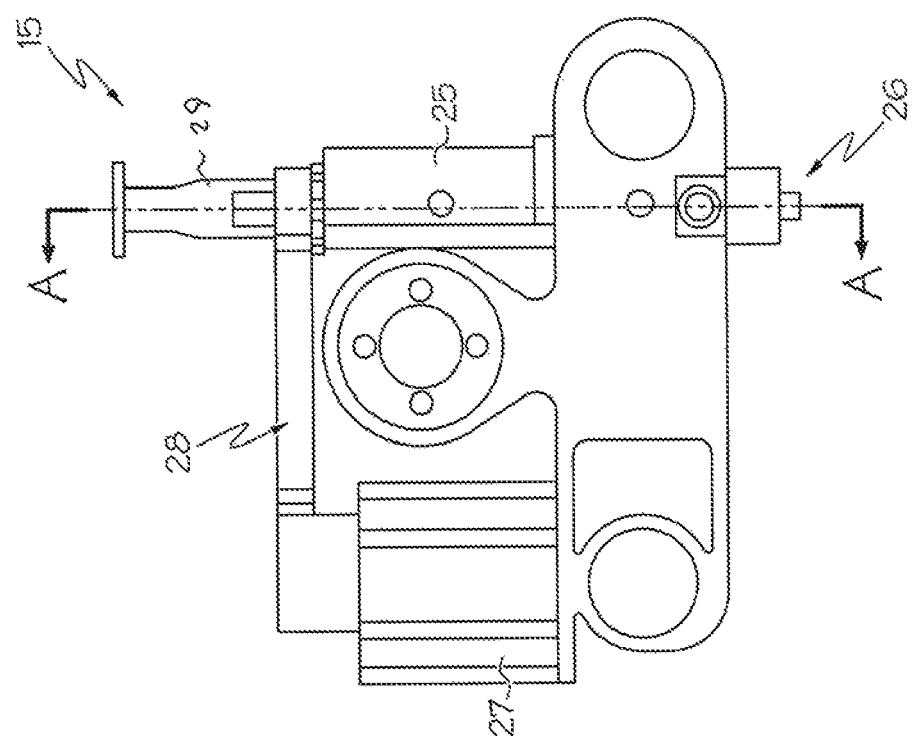

Referring now to FIGS. 3A-3B, there are depicted a side view and a cross-sectional view of extruder 15, respectively, in accordance with a preferred embodiment of the present invention. FIG. 3B is a cross-section view taken along line A-A of FIG. 3A. As shown, extruder 15 includes extruder syringe barrel 25, nozzle 26, pneumatic piston 27, lever arm 28 and plunger 29. Pneumatic piston 27 can be activated by pressurized air to move up in a vertical direction. Since one side of lever arm 28 is attached to pneumatic piston 27, so when pneumatic piston 27 moves up, lever arm 28 also moves up. Since plunger 29 is attached to the other side of lever arm 28, so when lever arm 28 moves up, plunger 29 moves up with lever arm 28. A negative pressure (or suction) is then produced within extruder syringe barrel 25 when plunger 29 moves up within extruder syringe barrel 25, and the negative pressure can prevent any unwanted dripping of print material through nozzle 26.

When printing is resumed, pneumatic piston 27 is retracted back to its original position, and lever arm 28 and plunger 29 also retracts back, which remove the negative pressure within extruder syringe barrel 25. As a result, print material within extruder syringe barrel 25 can flow out of nozzle 26.

Figure 4:
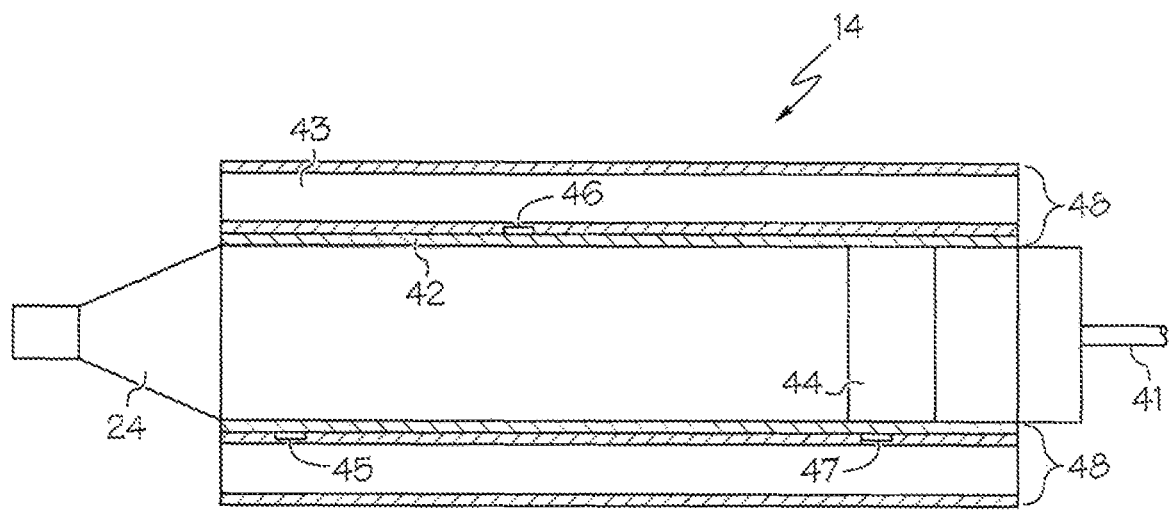
FIG. 4 is a cross-sectional diagram of a heating system within the 3D printer from FIGS. 1A-1C, in accordance with a preferred embodiment of the present invention.

With reference now to FIG. 4, there is depicted a cross-sectional diagram of a heating system for providing heat to cartridge 14, in accordance with a preferred embodiment of the present invention. As shown, a heating system includes a cylindrical sleeve 48 covering cartridge barrel 24 having a pneumatic input line 41 for pushing a piston 44 within cartridge barrel 24. Sleeve 48 includes an inner core 42 covered by an outer core 43. Inner core 42 is made of a sheet of copper metal, and copper is chosen for its high thermal conductivity. Inner core 42 makes a tight contact with the surface of cartridge barrel 24. The outer surface of inner core 42 holds three thin and flexible polymide heaters 45, 46, 47. Heaters 45-47 can be heated up at the same time in order to provide an equal amount of heat energy at three different locations within inner core 42. Because of its high thermal conductivity, inner core 42 can distribute heat evenly across its entire surface almost instantaneously. Inner core 42 is connected to a thermistor 52 (from FIG. 5) for sending signals to a processor 54 (from FIG. 5). When the temperature of inner core 42 has reached a predetermined set-point, processor 54 can turn off power to heaters 45-47.

Outer core 43 is made of ABS plastic, and is designed to provide good insulation to inner core 42 from the environment. Outer core 43 also has a honeycomb pattern within its body sandwiched between two solid shells. This honeycomb structure provides superior thermal insulation in comparison to a solid piece of ABS plastic.

Figure 5:
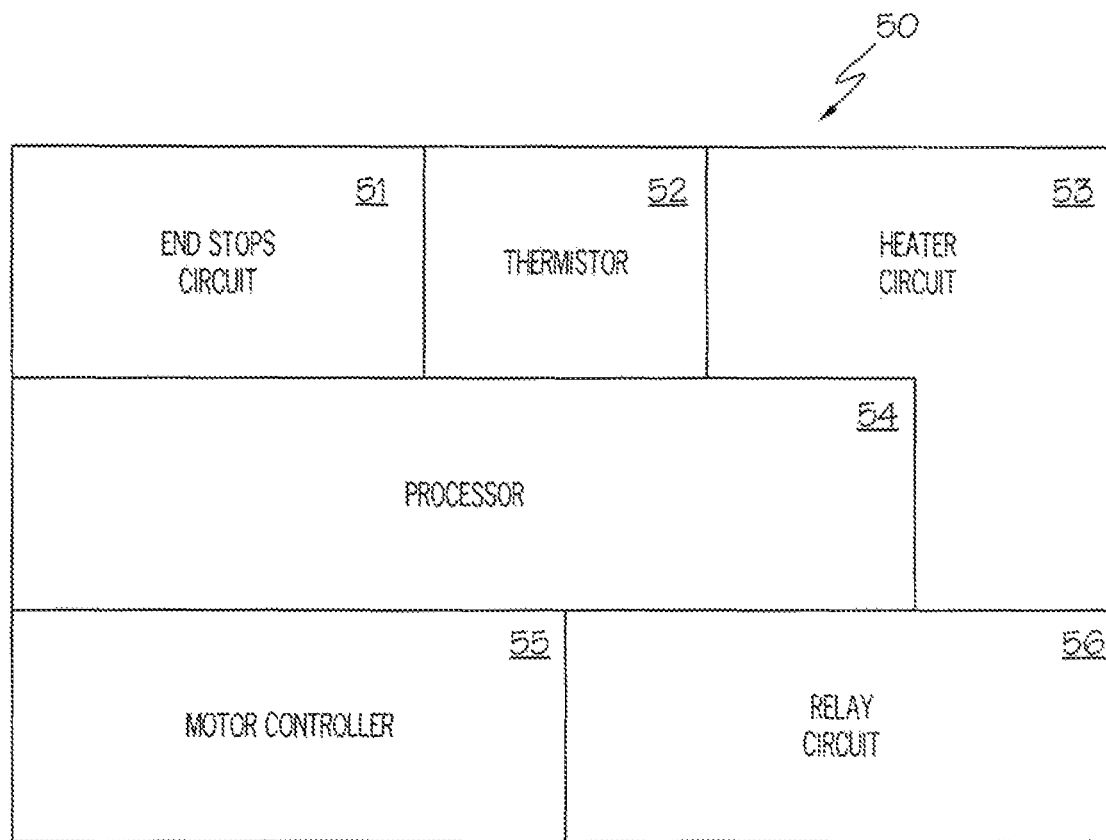
FIG. 5 is a block diagram of a circuit board for controlling various functions of the 3D printer from FIGS. 1A-1C, in accordance with a preferred embodiment of the present invention.

Referring now to FIG. 5, there is illustrated a block diagram of a circuit board for controlling various functions of 3D printer 10, in accordance with a preferred embodiment of the present invention. As shown, a circuit board 50, preferably located within bottom compartment 13 (from FIGS. 1A-1C), includes end stop circuits 51, thermistor 52, a heater circuit 53, a processor 54, a motor controller 55, a relay circuit 56 and a USB port 57. End stop circuits 51 preferably provide three separate end stops: one for the X-axis, one for the Y-axis and one for the Z-axis. When carriage comes to a zero position of its respective axis, a sensor within end stop circuits 51 sends a voltage signal to processor 54. Thermistor 52 processes signal coming from a sensor and sends the signal to processor 54. Heater circuit 53 provides power to heater 45-47 (from FIG. 4). Motor controller 55 controls the movements of one X stepper motor, one Y stepper motor and two Z stepper motors. Relay circuit 56 controls various pneumatic valves in solenoid 23 (from FIG. 2). USB port 57 can be utilized to communicate with circuit board 50.

3D printer 10 is preferably operated by a software application that includes three separate parts. The first part includes a computer-aid design (CAD) software, which allows a user to create pick and place object on the drawing space. The second part allows the user to convert their digital creation into machine code or GCODE. The GCODE output has two different delays between the printing processes (i.e., X, Y and Z point locations). The first delay, which lasts about 100 microseconds, is caused by a delay in communication between processor 54 and relay circuit 56. The second delay, which lasts about 1,000 microseconds, is caused by the fact that viscous material takes some time to come out of nozzle 26 after a command has been given to push a piston by the pressurized air. The second delay depends highly upon the type of print material being used. Viscous materials have damping and spring effect properties, which make them slower or faster under pneumatic push. A user can adjust these timing based on the type of print material being used.

The third part controls various motors within 3 D printer 10 to allow extruder 15 to print at various locations. 3D printer 10 can be controlled according to the generated GCODE, input manual GCODE and set cartridge temperature.

As has been described, the present invention provides a 3D printer for printing 3D solid objects.

Figures 6A, 6B, 6C:
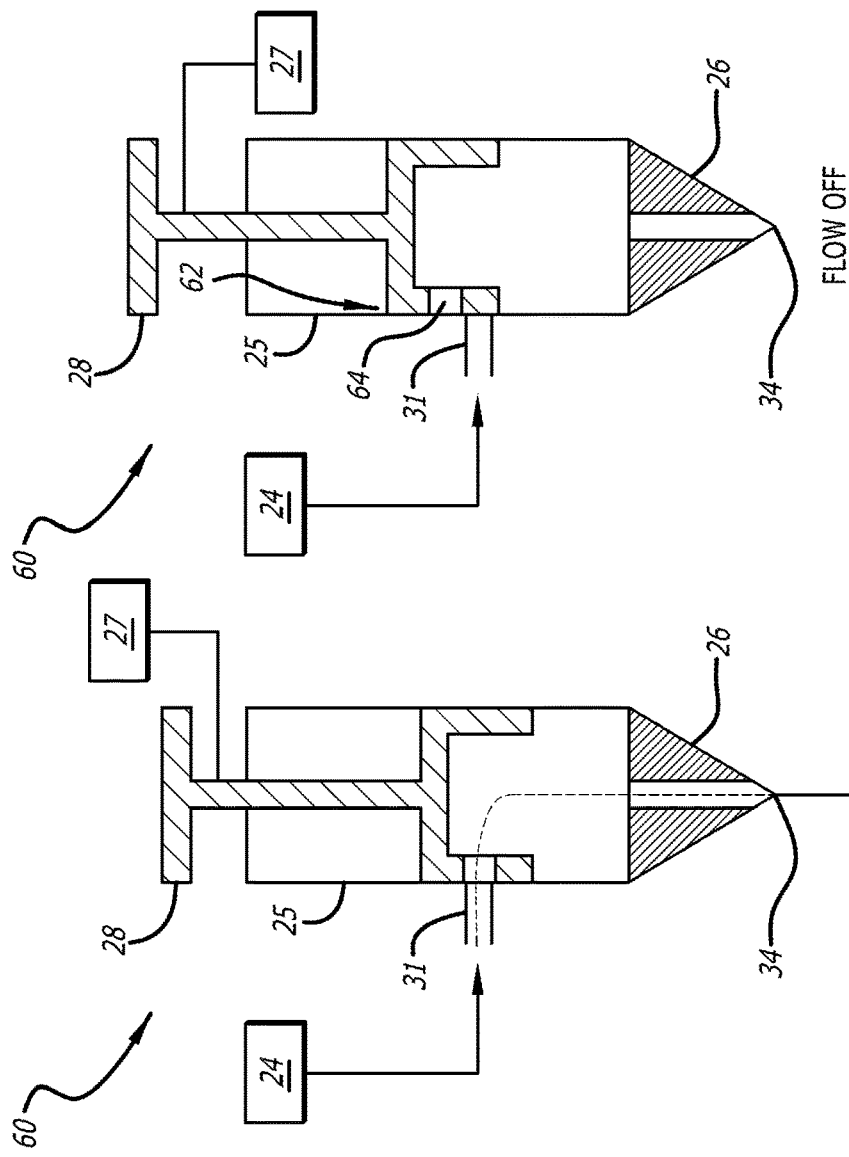
FIG. 6A is a block diagram of a first example of a portion of an extruder syringe barrel, a pneumatic piston and a lever arm including a plunger having an inlet port wherein print material is able to flow through a distal end of a nozzle of the pneumatic system in accordance with a preferred embodiment of the present invention.
FIG. 6B is a block diagram of the first example of the portion of a pneumatic system of FIG. 6A wherein print material is unable to flow through a distal end of a nozzle of the pneumatic system in accordance with a preferred embodiment of the present invention.
FIG. 6C is a side perspective of the pneumatic system of FIGS. 6A-6B in accordance with a preferred embodiment of the present invention.

Referring now to FIG. 6A, a block diagram of a first example of a portion of an extruder syringe barrel, a pneumatic piston and a lever arm including a plunger having an inlet port wherein print material is able to flow through a distal end of a nozzle of the pneumatic system is shown in accordance with a preferred embodiment of the present invention. FIG. 6A depicts a block diagram of one embodiment of a portion of a pneumatic system that may be present within 3D printer 10 of FIGS. 1A-1C. As shown in FIG. 6A, the illustration of a pneumatic system 60 includes the cartridge barrel 24, the extruder syringe barrel 25 and the pneumatic piston 27. Cartridge barrel 24 is contained within a printer cartridge, and extruder syringe barrel 25 is configured with a lever arm 28 and plunger 62 and is in communication with the pneumatic piston 27. The plunger 62 includes an inlet port 64 being a lumen such that the alignment of the inlet port 64 with the entry point 31 of the syringe barrel 25 enables flow of print material to the nozzle 26. Specifically, when printing is to occur, execution of instructions comprising a digital design file cause pressurized air to depress the lever arm 28 causing alignment of the inlet port 64 with the entry point 31. As will be discussed below, when printing is to pause or cease, the raising of the lever arm 28 both (i) creates suction within the syringe barrel 25, and (ii) causes misalignment of the inlet port 64 and the entry point 31. As a result, print material is prevented from flowing into the syringe barrel, thereby preventing any unwanted drippage that is not in accordance with the instructions set forth in the digital design file.

As discussed above with respect to at least FIG. 2, pressurized air enters 3D printer 10 via air intake 21 and proceeds to solenoid valve 23 after the pressure is regulated by pressure regulator 22. During a printing operation, pressurized air exits solenoid valve 23 via exit port x1 and enters a Y-connector 72 that sends the pressurized air to cartridge barrel 24 and an air-activated pneumatic piston 27. Within cartridge barrel 24, the pressurized air pushes a piston (not shown) that, in turn, pushes the print material out of cartridge barrel 24 into the extruder syringe barrel 25 at the entry point 31.

Additionally, the pressurized air is also provided to the pneumatic piston 27 via the Y-connector 72, which is connected to the lever arm 28 and, consequently, the plunger 62. The pressurized air is applied via the pneumatic piston 27 through entry point Y1 to raise the lever arm 28 creating a pathway from the tubing extending from the cartridge barrel 24 to the nozzle 26.

As the extruder syringe barrel 25 fills with the print material, the print material may be flow into and be extruded out of a nozzle 26, wherein the print material enters the extruder syringe barrel 25 according to a digital design file (e.g., the digital design file provides executable instructions that control when pressurized air is provided to push the piston within the cartridge barrel 24).

When the printing is to stop (e.g., in accordance with the digital design file), the print material is positioned to drip from of nozzle 26 due to the fluid nature of the print material and gravitational pull. In order to prevent unwanted dripping of the print material from of nozzle 26, in the embodiment of FIGS. 6A-6B, the pneumatic piston 27, lever arm 28 and plunger 62 are utilized to create back pressure within extruder syringe barrel 25 and block additional print material from entering the syringe barrel 25. Specifically, pressure is released from exit port x1 to stop printing, and pressure is immediately applied to exit port x2, such that pressurized air exits solenoid valve 23 via exit port x2 and enters pneumatic piston 27 via entry port y2 to raise lever arm 28. Lever arm 28 is connected to plunger 62. When lever arm 28 is raised, plunger 62 is also raised within extruder syringe barrel 25 to change the internal volume of extruder syringe barrel 25 thereby causing a misalignment of the inlet port 64 and the entry 31, which prevents any excess print material within the cartridge barrel 24 and/or within a tubing connecting the cartridge barrel 24 with the syringe barrel 25 from dripping through nozzle 26.

When the print material needs to be extruded out of nozzle 26 again (i.e., printing resumes), pressurized air is switched from exiting solenoid valve 23 via exit port x2 back to exiting solenoid valve 23 via exit port x1. At this instance, pressurized air from the solenoid value 23 is provided to (1) the cartridge barrel 24 to push print material to the syringe barrel 25, and (2) to the lever arm 28 to realign the inlet port 64 with the entry point 31.

Referring to FIG. 6B, a block diagram of the first example of the portion of a pneumatic system of FIG. 6A wherein print material is unable to flow through a distal end of a nozzle of the pneumatic system is shown in accordance with a preferred embodiment of the present invention. As discussed above, in order to prevent dripping of print material when printing is stopped, or paused, pressure is released from exit port x1 to stop printing, and pressure is immediately applied to exit port x2 such that pressurized air exits solenoid valve 23 via exit port x2 and enters pneumatic piston 27 via entry port y2 to raise lever arm 28, which also raises the plunger 62. Raising of the lever arm (1) changes the internal volume of the extruder syringe barrel 25, which instantaneously produces a suction within extruder syringe barrel 25, which prevents print material within the extruder syringe barrel 25 from dripping through nozzle 26, and (2) creates a misalignment of the inlet port 64 and the entry point 31, which prevents any excess print material within the cartridge barrel 24 and/or within a tubing connecting the cartridge barrel 24 with the syringe barrel 25 from dripping through nozzle 26.

Referring to FIG. 6C, a side perspective of the pneumatic system of FIGS. 6A-6B is shown in accordance with a preferred embodiment of the present invention. In one embodiment, as illustrated the inlet port 64 and the entry point 31 may take a similar shape (e.g., circular) and size. However, this need not be the case, instead "alignment" of the inlet port 64 and the entry point 31 refers to the positioning of the inlet port 64 and the entry point 31 to enable print material to flow from through the entry point 31 and the inlet port 64 (i.e., creating the pathway from the tubing extending from the cartridge barrel 24 to the nozzle 26 discussed above). For example, the entry point 31 and the inlet port 64 may have different shapes and/or sizes so long as such as pathway is created when the entry point 31 and the inlet port 64 are in alignment.

Referring now to FIG. 7A, a block diagram of a first example of a portion of an extruder syringe barrel, a pneumatic piston and a lever arm wherein print material is able to flow through a distal end of a nozzle of the pneumatic system is shown in accordance with a preferred embodiment of the present invention. FIG. 7A depicts a block diagram of one embodiment of a portion of a pneumatic system that may be present within 3D printer 10 of FIGS. 1A-1C. As shown in FIG. 7A, the illustration of a pneumatic system 70 includes a cartridge barrel 24 and an extruder syringe barrel 25. Cartridge barrel 24 is contained within a printer cartridge, and extruder syringe barrel 25.

As discussed above with respect to at least FIG. 2, pressurized air enters 3D printer 10 via air intake 21 and proceeds to solenoid valve 23 after the pressure is regulated by pressure regulator 22. During a printing operation, pressurized air exits solenoid valve 23 via exit port x1 and enters a Y-connector 72 that sends the pressurized air to cartridge barrel 24 and an air-activated pneumatic piston 27. Within cartridge barrel 24, the pressurized air pushes a piston (not shown) that, in turn, pushes the print material out of cartridge barrel 24 into the extruder syringe barrel 25 at the entry point 31.

The pressurized air also enters pneumatic piston 27, which is connected to a lever arm 28 and a plunger 29. As the extruder syringe barrel 25 fills with the print material, the print material may be flow into and be extruded out of a nozzle 26, wherein the print material enters the extruder syringe barrel 25 according to a digital design file (e.g., the digital design file provides executable instructions that control when pressurized air is provided to push the piston within the cartridge barrel 24).

When printing is been stopped (e.g., in accordance with the digital design file), the print material may still dripping out of nozzle 26 due to the fluid nature of the print material and gravitational pull. In order to prevent unwanted dripping of the print material out of nozzle 26 in the embodiment illustrated in FIG. 7A, the lever arm 28 is depressed or otherwise pushed toward the nozzle 26 such that the distal tip 32 of the lever arm 28 plugs a nozzle lumen 33. Specifically, when instructions provided in the digital design file indicate printing is to stop (e.g., due to completion of the printing or to change/refill print materials, etc.) pressurized air is provided from the pneumatic piston 27 to the lever arm 28 resulting in the depression of the lever arm 28 and the plunger 29. As the distal tip 32 of the lever arm 28 blocks the nozzle lumen 33, print material is prevented from dripping from the nozzle 26.

When the print material needs to be extruded out of nozzle 26 again (i.e., printing resumes), pressurized air is switched from exiting solenoid valve 23 via exit port x2 back to exiting solenoid valve 23 via exit port x1. At this instance, pressurized air from solenoid valve 23 again pushes the print material from cartridge barrel 24 to extruder syringe barrel 25 and nozzle 26. Additionally, in one embodiment, a spring may surround or otherwise coupled to a portion of the lever arm 28 that is compressed when pressurized air is applied to the lever arm 28 via the pneumatic piston 27 (i.e., to prevent dripping of print material). When printing resumes, pressurized air is no longer applied to the lever arm 28 and the spring decompresses thereby pushing the lever arm 28 away from the nozzle 26, which allows the print material to resume flowing through the nozzle lumen 33 to be extruded through the distal tip 34 of the nozzle 26 in accordance with the digital design file. As alternative embodiment to the utilization of a spring to raise the lever arm 28, pressurized air may be applied to the raise the lever arm 28 as discussed above with respect to at least FIGS. 6A-6C.

Referring to FIG. 7B, a block diagram of the first example of the portion of a pneumatic system of FIG. 7A wherein print material is unable to flow through a distal end of a nozzle of the pneumatic system is shown in accordance with a preferred embodiment of the present invention. As discussed above, in order to prevent dripping of print material when printing is stopped, or paused, the pneumatic piston applies pressurized air to the lever arm 28 to causes a depression of the lever arm 28 (e.g., movement toward the nozzle 26). The depression of the lever arm 28 causes the a distal top 32 of the lever arm 28 to block an opening of the nozzle lumen 33, wherein the opening of the nozzle lumen 33 is located at a distal end 30 of the extruder syringe barrel 25.

Figure 8:
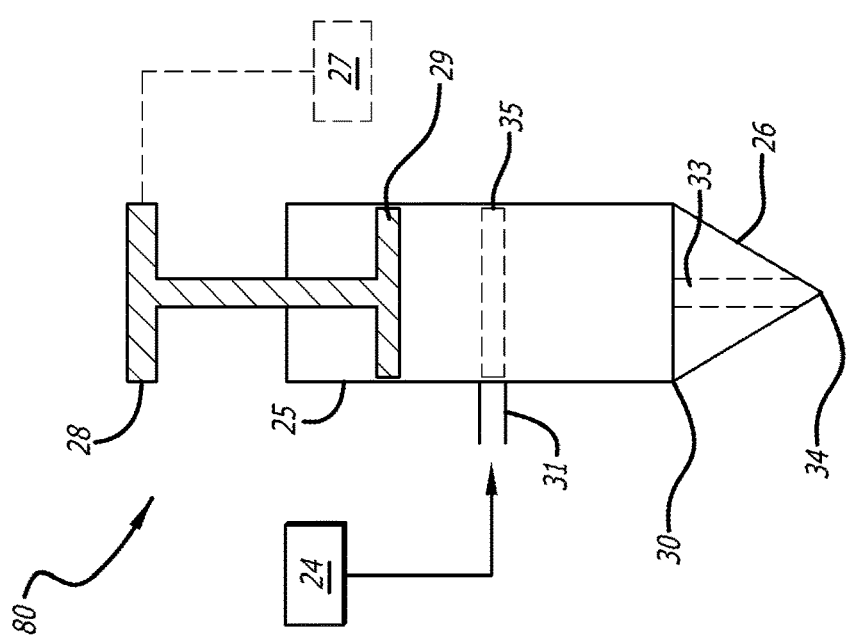
FIG. 8 is a block diagram of a second example of a portion of a pneumatic system within a 3D printer, in accordance with a preferred embodiment of the present invention.

Referring to FIG. 8, a block diagram of a second example of a portion of a pneumatic system 80 within a 3D printer is shown in accordance with a preferred embodiment of the present invention. The embodiment illustrated in FIG. 8 is seen to include a lever arm 28 and a plunger 29. In a similar manner as the embodiments discussed above with respect to FIGS. 7A-7B, when printing is to stop or pause in accordance with execution of the digital design file, the pneumatic piston 27 applies pressurized air to the lever arm 28 thereby depressing the lever arm 28 and the plunger 29 (i.e., toward the nozzle 26). Pressurized air may be applied in order to depress the plunger 29 at least to a stopping point 35 that is located adjacent to the entry point 31 (i.e., thereby blocking print material from flowing into the extruder syringe barrel 25). In some embodiments, the plunger 29 may be depressed to any point distal the entry point 31, thereby blocking print material from entering the nozzle lumen 33. In some embodiments, although not shown, the plunger 29 need not extend the width of the extruder syringe barrel 25 but may instead have a width at least wide enough to cover an opening of the nozzle lumen 33, in embodiments in which the plunger 29 is depressed to the distal end 30 of the extruder syringe barrel.

Figure 9B:
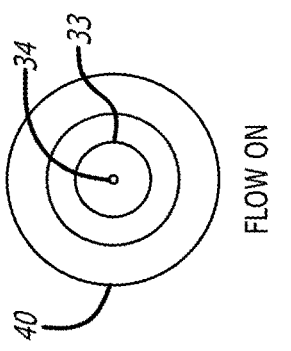
FIG. 9B is an illustrative diagram of the pneumatic system of FIG. 9A wherein print material is able to flow through a distal end of a nozzle of the pneumatic system, in accordance with a preferred embodiment of the present invention.
Figure 9C:
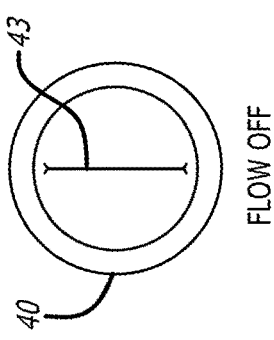
FIG. 9C is an illustrative diagram of the pneumatic system of FIG. 9A wherein print material is unable to flow through a distal end of a nozzle of the pneumatic system, in accordance with a preferred embodiment of the present invention.
Figure 9A:
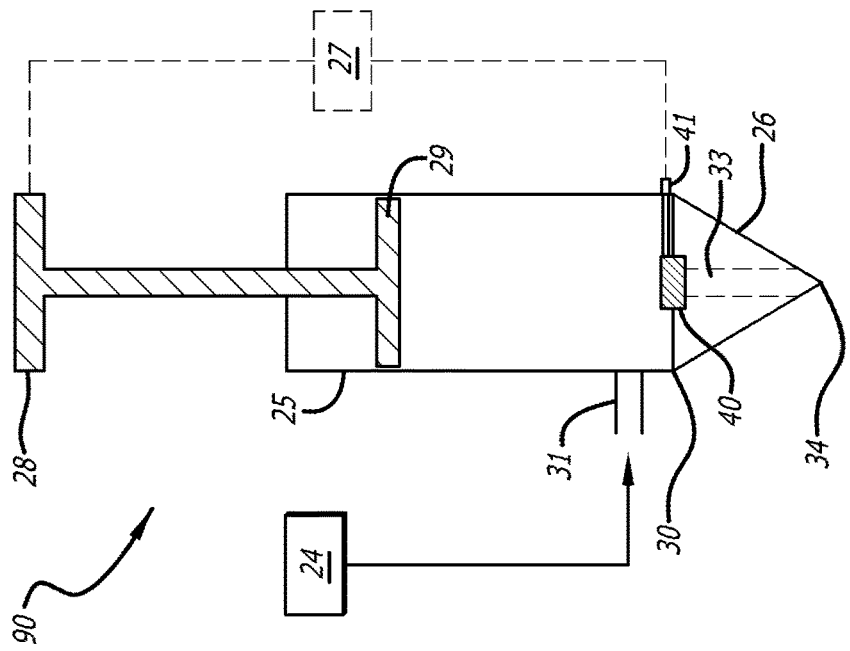
FIG. 9A is a block diagram of a third example of a portion of a pneumatic system within a 3D printer, in accordance with a preferred embodiment of the present invention.

Referring to FIG. 9A, a block diagram of a third example of a portion of a pneumatic system 90 within a 3D printer is shown in accordance with a preferred embodiment of the present invention. As described above, one desired characteristic of a 3D printer, such as the 3D printer 10, is to prevent dripping of excess print material when printing is stopped or paused in accordance with execution of a digital design file. The embodiment illustrated in FIG. 9A includes an inflatable ring or balloon ("balloon") 40 located at the distal end 30 of the extruder syringe barrel 25 and configured to, when inflated, cover an opening of the nozzle lumen 33. The pneumatic piston 27 may be configured to provide pressurized air in accordance with execution of the digital design file to port 41, which causes inflation of the balloon 40.

Referring now to FIG. 9B, an illustrative diagram of the pneumatic system 90 of FIG. 9A wherein print material is able to flow through a distal end of a nozzle of the pneumatic system is shown in accordance with a preferred embodiment of the present invention. The illustration of FIG. 9B illustrates a top perspective of the distal end 30 of the extruder syringe barrel 25 wherein the balloon 40 is deflated such that the nozzle lumen 33 and the distal tip 34 of the nozzle 26 are visible. However, referring to FIG. 9C, an illustrative diagram of the pneumatic system of FIG. 9A wherein print material is unable to flow through a distal end of a nozzle of the pneumatic system is shown in accordance with a preferred embodiment of the present invention. The illustration of FIG. 9C illustrates a top perspective of the distal end 30 of the extruder syringe barrel 25 wherein the balloon 40 is inflated such that the nozzle lumen 33 and the distal tip 34 of the nozzle 26 are not visible. In some embodiments, the balloon 40 may be formed such that the material comprising the balloon is distributed in such a way so as to form a slit 43. In other embodiments, not shown, the balloon 43 may formed with material that is evenly distributed such that a dot is formed (instead of the slit 43).

While the invention has been particularly shown and described with reference to a preferred embodiment, it will be understood by those skilled in the art that various changes in form and detail may be made therein without departing from the spirit and scope of the invention.

What is claimed is:

1. An apparatus comprising:
   a printer cartridge having a cartridge barrel for containing print material;
   an extruder having a nozzle, a syringe barrel, and a lever arm, the lever arm including a plunger, the plunger having (i) a disc and (ii) a portion that extends distally from the disc toward the nozzle and is configured to contact an interior of the syringe barrel, wherein an inlet port is disposed through the portion that extends distally from the disc toward the nozzle; and
   a pneumatic system including a pneumatic piston, a solenoid valve and a Y-connector, wherein the pneumatic piston is configured to receive pressurized air from (1) the Y-connector to lower the lever arm into the syringe barrel of the extruder to align the inlet port with an entry point of the extruder enabling the print material to flow into the extruder through the inlet port, and (2) the solenoid valve to raise the lever arm to (i) misalign the inlet port and the entry point to prevent additional print material from flowing into the extruder and (ii) create suction within the syringe barrel thereby preventing the print material from extruding from the nozzle.

2. The apparatus of claim 1, further comprising:
   a build platform; and
   a plurality of rods and screws for guiding the extruder to dispense the print material at specific locations to form a three-dimensional object on the build platform.

3. The apparatus of claim 2, wherein the screws are turned by a plurality of stepper motors.

4. The apparatus of claim 1, wherein the pneumatic system includes a pressure regulator for regulating the pressure of incoming pressurized air received by the pneumatic system.

5. The apparatus of claim 1, wherein the solenoid valve receives an electrical signal to control supply of the pressurized air to either the Y-connector or the pneumatic piston.

6. The apparatus of claim 1, wherein raising the lever arm creates suction within the extruder preventing the print material from extruding from the nozzle.

7. The apparatus of claim 1, wherein the print material includes at least one of plastisol, polymer clay, melted sugar or melted chocolate.

8. The apparatus of claim 1, wherein the pneumatic piston is configured to selectively provide the pressurized air to the lever arm in accordance with execution of instructions included in a design file.

9. The apparatus of claim 1, further comprising:
a cooling diffuser configured to provide additional pressurized air as the print material is extruded from the nozzle to cool the print material.

10. The apparatus of claim 1, further comprising:
a heating system configured to provide heat to the printer cartridge.

11. The apparatus of claim 1, wherein the print material includes one or more of plastisol, polymer clay, sugar, or chocolate.

\* \* \* \* \*